(12) United States Patent
Kim

(10) Patent No.: US 7,813,175 B2
(45) Date of Patent: Oct. 12, 2010

(54) SMART CARD CAPABLE OF SENSING LIGHT

(75) Inventor: Min-Kyu Kim, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 413 days.

(21) Appl. No.: 11/945,502

(22) Filed: Nov. 27, 2007

(65) Prior Publication Data

US 2008/0135966 A1 Jun. 12, 2008

(30) Foreign Application Priority Data

Dec. 6, 2006 (KR) .................. 10-2006-0123219

(51) Int. Cl.
*G11C 11/34* (2006.01)
(52) U.S. Cl. .................. 365/185.05; 365/51; 365/52; 714/48; 714/49
(58) Field of Classification Search ............. 365/51, 365/52, 185.05, 189.09; 714/48, 49
See application file for complete search history.

(56) References Cited

U.S. PATENT DOCUMENTS

| 7,483,328 | B2 * | 1/2009 | Kim et al. ............ 365/226 |
| 7,503,501 | B2 * | 3/2009 | Jeong ................ 235/487 |
| 2003/0149914 | A1 * | 8/2003 | Kim ................. 714/30 |
| 2004/0174749 | A1 | 9/2004 | Hollmer |

FOREIGN PATENT DOCUMENTS

| KR | 1020030066858 A | 8/2003 |
| KR | 10-2004-0053803 A | 6/2004 |
| KR | 1020050066558 A | 6/2005 |

* cited by examiner

*Primary Examiner*—Tuan T Nguyen
*Assistant Examiner*—Toan Le
(74) *Attorney, Agent, or Firm*—F. Chau & Associates, LLC

(57) ABSTRACT

A smart card is formed of a memory having light-sensing cells to sense externally supplied light and generate a detection signal in response to the externally supplied light being sensed by the light-sensing cells, and a reset control circuit generating a reset signal in response to the detection signal, the reset signal operating to reset the smart card.

14 Claims, 6 Drawing Sheets

151

(a)   (b)

152

(a)   (b)

SMART CARD CAPABLE OF SENSING LIGHT

CROSS-REFERENCE TO RELATED APPLICATION

This U.S. non-provisional patent application claims priority under 35 U.S.C. §119 of Korean Patent Application No. 2006-123219 filed on Dec. 6, 2006, the entire contents of which are incorporated herein by reference.

BACKGROUND

The present disclosure relates to smart cards and, more particularly, to smart cards sensing attacks thereto from light sources.

Smart cards have integrated circuit (IC) chips for processing specific operations by embedding microprocessors, card operating systems, security modules, and memories therein. Smart cards are equipped to perform various functions such as arithmetic operations, encryption, and bilateral communication, and offer high security and portability for users.

Smart cards are able to store and process information, unlike other kinds of memory cards that simply contain memory devices. Operations for reading, writing, and erasing data and programs stored in a smart card, and communicating data between the smart card and an external system, are strictly controlled and protected from external attacks by built-in physical security functions and an elaborate encryption system. Owing to those practical merits, smart cards are widely used in various commercial applications, such as, payment for a fee of a mobile phone, personal identification for internet access, payment for a parking fare, payment for subway, train, bus, highway tolls, direct provision of personal records to hospitals or doctors without additional forms, purchase from internet markets, gasoline and oil supply at gas stations, and so on.

For those functions, smart cards are generally required to have their internal integrated circuit (IC) chips charged with cash or store numbers or information of credit cards, or personal specifications. Therefore, it is essential for the internal information of smart cards to be secure in order to safely use them.

With a recent increase in the use of smart cards, as more and more security techniques are provided for the IC chips thereof, there are various attacking techniques to break their protection systems for pecuniary profits.

Unauthorized access to the smart card in general is called 'tampering'. Techniques of tampering may be divided into microprobing, software attacks, eavesdropping, and fault generation.

A microprobing technique may be used for directly accessing the surface of an IC chip. A software attack is operable with a general communication interface, utilizing security vulnerability arising from protocols, an encryption algorithm, or execution of an algorithm. An eavesdropping technique is carried out by evaluating analog characteristics of all supplies and interface couplings and measuring electromagnetic radiation generated from a processor during a normal operation. A fault generation technique operates to create a malfunction of a processor to provide an additional access by means of abnormal environment conditions. The microprobing technique is a kind of invasive attack, requiring a lot of time. The other techniques are kinds of non-invasive attacks.

As one kind of non-invasive attack, a glitch attacking technique is able to freely hack a smart card by applying an external signal thereto to make it operate irregularly or applying an abnormal signal to its power.

In recent years, there is an attacking technique intending to change data of a memory in a smart card by means of a laser that can be emitted locally, which makes it difficult to clearly protect smart cards that use conventional optical sensors.

SUMMARY OF THE INVENTION

Exemplary embodiments of the present invention are directed to solving the aforementioned shortcomings, and providing a smart card capable of sensing an attempt for changing data by locally irradiating light thereto.

An exemplary embodiment of the present invention provides a smart card comprised of: a memory having light-sensing cells to sense external light and generating a detection signal in response to the external light sensed by the light-sensing cell; and a reset control circuit generating a reset signal in response to the detection signal, the reset signal operating to reset the smart card.

In an exemplary embodiment, the light-sensing cell includes a junction from which a leakage current is generated.

In an exemplary embodiment, the light-sensing cells are arranged in a plurality of light-sensing arrays arranged between a plurality of memory cell arrays.

In an exemplary embodiment, the light-sensing cells are normally conditioned to be off-cells.

According to an exemplary embodiment, the smart-card memory is comprised of: a plurality of memory cell an arrays including normal cells each of which has a drain connected to a bit line, a source connected to a common source line, and a gate coupled to a word line; a plurality of light-sensing cell arrays including normal cells each of which has a drain connected to a sensing bit line, a gate coupled to the word line, and a source that is floated; and a sensing amplifier connected to the sensing bit line, generating the detection signal by sensing a leakage signal that flows through the sensing bit line from the light-sensing cell if external light is irradiated on the light-sensing cell.

In an exemplary embodiment, the normal cell is a NOR-type cell.

In an exemplary embodiment, the normal cell is one of a stacked-gate cell, a split-gate cell, and a source-side injection cell.

According to an exemplary embodiment, the memory is comprised of: a plurality of memory cell arrays including normal cells each of which has a drain connected to a bit line, a source connected to a common source line, and a gate coupled to a word line; a plurality of light-sensing cell arrays including normal cells each of which has a drain connected to a sensing bit line, a source connected to the common source line, and a gate that is floated; and a sensing amplifier connected to the sensing bit line, generating a detection signal by sensing a leakage signal that flows through the sensing bit line from the light-sensing cell if external light is irradiated on the light-sensing cell.

In an exemplary embodiment, the memory is comprised of: a plurality of memory cell arrays including normal cells each of which has a drain connected to a bit line, a source connected to a common source line, and a gate coupled to a word line; a plurality of light-sensing cell arrays including normal cells each of which has a drain connected to a sensing bit line, a source connected to the common source line, and a gate that is grounded; and a sensing amplifier connected to the sensing bit line, generating a detection signal by sensing a leakage signal that flows through the sensing bit line from the light-sensing cell if external light is irradiated on the light-sensing cell.

According to an exemplary embodiment, the memory is comprised of: a plurality of memory cell arrays including normal cells each of which has a drain connected to a bit line, a source connected to a common source line, and a gate coupled to a word line; a plurality of light-sensing cell arrays including normal cells each of which has a drain connected to a sensing bit line, a gate coupled to the word line, and a source that is floated; a multiplexer selectively activating the plurality of sensing bit lines in response to a selection signal; and a sensing amplifier generating a detection signal by sensing a leakage signal that flows through the sensing bit line from the light-sensing cell if external light is irradiated on the light-sensing cell. The multiplexer has a plurality of NMOS transistors, in which each NMOS transistor includes a drain connected to the sensing bit line, a source connected to the sensing amplifier, and a gate coupled to the selection signal.

In an exemplary embodiment, the memory is comprised of: a plurality of memory cell arrays including normal cells each of which has a drain connected to a bit line, a source connected to a common source line, and a gate coupled to a word line; a plurality of light-sensing cell arrays including normal cells each of which has a drain connected to a sensing bit line, a source connected to the common source line, and a gate that is floated; a multiplexer selectively activating the plurality of sensing bit lines in response to a selection signal; and a sensing amplifier connected to the sensing bit line, generating a detection signal by sensing a leakage signal that flows through the sensing bit line from the light-sensing cell if external light is irradiated on the light-sensing cell. The multiplexer has a plurality of NMOS transistors, in which each NMOS transistor includes a drain connected to the sensing bit line, a source connected to the sensing amplifier, and a gate coupled to the selection signal.

In an exemplary embodiment, the memory is a nonvolatile memory.

A further understanding of the nature and advantages of exemplary embodiments of the present invention may be realized by reference to the remaining portions of the specification and the attached drawings.

BRIEF DESCRIPTION OF THE FIGURES

Exemplary embodiments of the present invention will be understood in more detail from the following descriptions taken in conjunction with the attached figures, wherein like reference numerals refer to like parts throughout the various figures unless otherwise specified. In the figures.

DETAILED DESCRIPTION OF EXEMPLARY EMBODIMENTS

Figure 1:
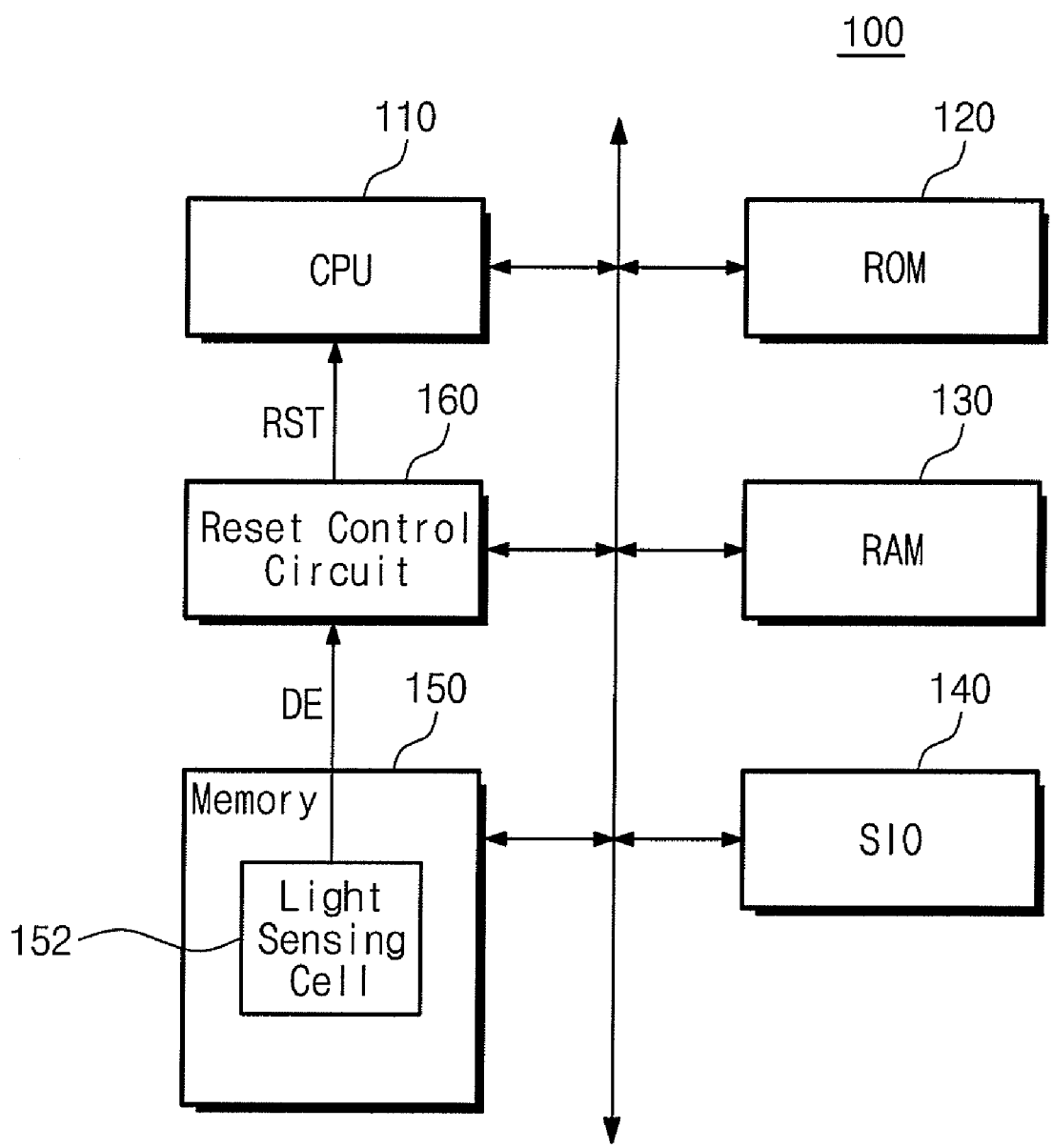
FIG. 1 is a block diagram of a smart card according to an exemplary embodiment of the present invention.

Exemplary embodiments of the present invention will be described below in more detail with reference to the accompanying drawings. The present invention may, however, be embodied in different forms and should not be constructed as limited to the exemplary embodiments set forth herein. Rather, these exemplary embodiments are provided so that this disclosure will be thorough and complete, and will fully convey the scope of the present invention to those of ordinary skill in the art. Like reference numerals refer to like elements throughout the accompanying figures.

Hereinafter, will be described exemplary embodiments of the present invention in conjunction with the accompanying drawings.

FIG. 1 is a block diagram of a smart card 100 according to an exemplary embodiment of the present invention. Referring to FIG. 1, the smart card 100 is comprised of a central processing unit (CPU) 110, a read-only memory (ROM) 120, a random access memory (RAM) 130, a serial input/output (SIO) interface 140, a memory 150, and a reset control circuit 160.

The CPU 110 controls an overall operation of the smart card 100. The ROM 120 is programmed with basic commands and a card operating system (COS) for managing the IC chip (not shown) of the smart card 100. The RAM 130 is used for managing temporary data and storing intermediate results of calculations made by the CPU 110. The SIO interface 140 is provided to transceive data between the smart card 100 and an external terminal (not shown).

The memory 150 stores user information protected from an external attack by the COS, for example, a data set including card issuer data and user data, and functions applicable in various applications. The memory 150 includes normal memory cells (not shown) and a light-sensing cell 152. The light-sensing cell 152 generates a detection signal DE by sensing light irradiated thereto. The light-sensing cell 152 includes a junction capable of generating a leakage current in response to light irradiated thereon.

The reset control circuit 160 generates a reset signal RST for resetting the CPU 110 in accordance with a detection result of an operating condition of the smart card 100. The reset signal RST of the reset control circuit 160 is provided to prevent damage when detecting an abnormal state of the smart card 100.

The reset control circuit 160 is configured by including various kinds of detectors for sensing abnormal states of the smart card 100 and external attacks of unauthorized users. Although not shown, such detectors include an exposure detector, a passivation removal detector, a frequency detector, a voltage detector, and a temperature detector. The exposure detector (not shown) generates the reset signal RST when the chip surface is exposed to light in an effort to remove a silicon oxide film that is used as a protection layer of the smart card. The frequency detector (not shown) operates to detect a frequency of a main clock signal, and generates the reset signal RST when a detected frequency is out of a predetermined range. The voltage detector (not shown) operates to detect a voltage level supplied externally, from a card reader, and generates the reset signal RST when a detected voltage is out of a regular range. The temperature detector (not shown) operates to detect the temperature around the smart card, and generates the reset signal RST when the detected temperature is higher or lower than a predetermined range. On the other hand, the reset control circuit 160 generates the reset signal RST in response to the detection signal DE upon sensing light, which is irradiated thereto, by the memory 150.

The memory 150 of the smart card 100 according to an exemplary embodiment of the present invention may be comprised of a plurality of light-sensing cell arrays, although only the light sensing cell 152 is shown in FIG. 1. The light-sensing cell 152 of the memory 150 generates the detection signal DE from light irradiated thereto. The detection signal DE is transferred to the reset control circuit 160. The reset control circuit 160 generates the reset signal RST in response to the detection signal DE, thereby resetting the smart card 100.

Figure 2:
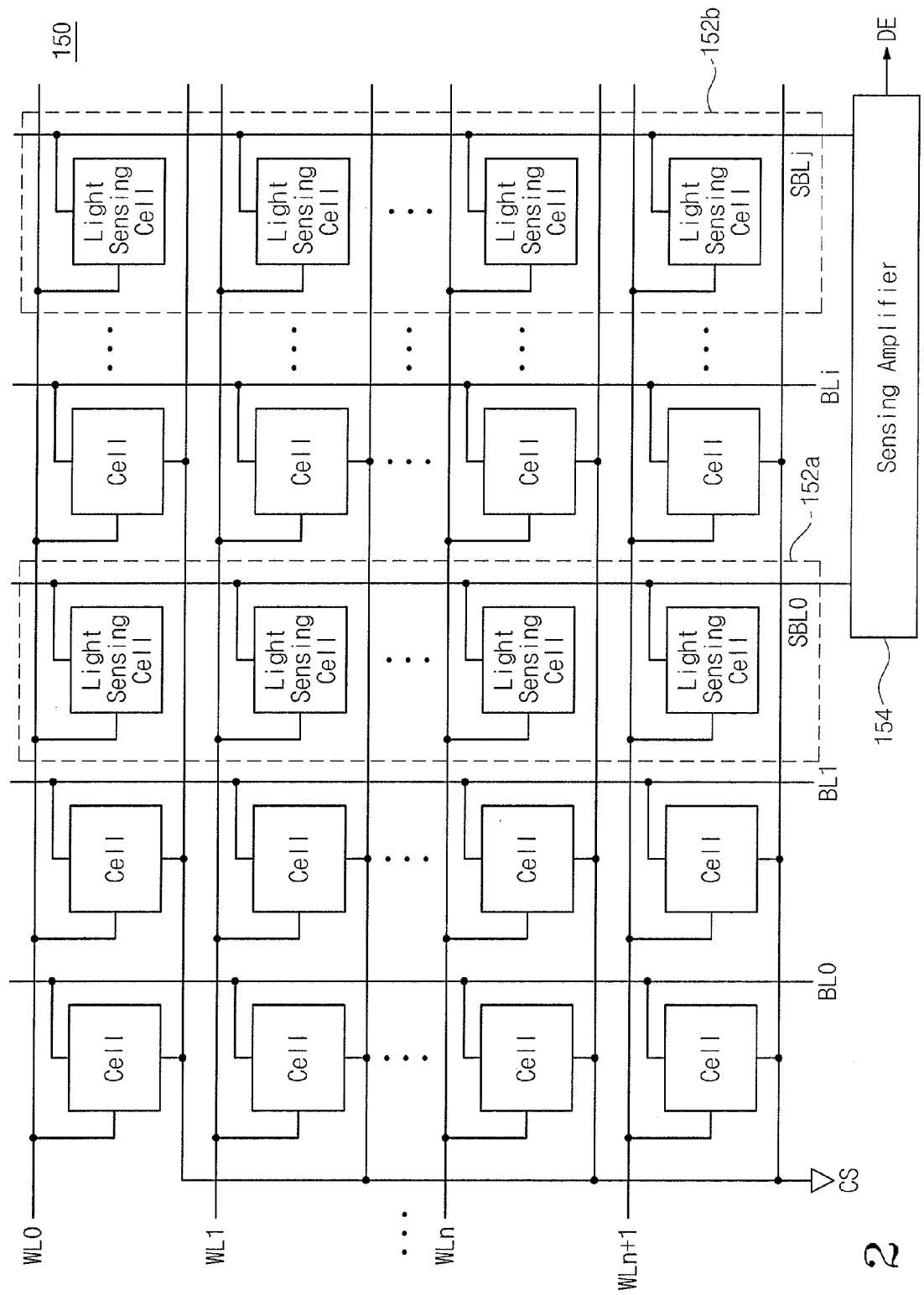
FIG. 2 is a core circuit diagram of a memory in accordance with an exemplary embodiment of the present invention.

FIG. 2 is a core circuit diagram of the memory 150 in accordance with an exemplary embodiment of the present invention. Referring to FIG. 2, the memory 150 includes a plurality of light-sensing cell arrays 152a and 152b. For convenience of description, FIG. 2 representatively shows the two light-sensing cell arrays 152a and 152b. An interval between the light-sensing cell arrays 152a and 152b is preferred to be identical to or smaller than a spot size of a laser irradiated thereto.

The light-sensing cell arrays 152a and 152b of the memory 150 sense the locally irradiated light. When a hacker irradiates light on the light-sensing arrays 152a and 152b of the memory 150, a leakage current is generated through the light-sensing arrays 152a and 152b by the irradiated light. The leakage current is transferred to a sensing amplifier 154 by way of a sensing bit lines SBL0 and SBLj. The sensing amplifier 154 generates the detection signal DE by sensing and amplifying the leakage current. The detection signal DE is output to the reset control circuit 160 as shown in FIG. 1.

In the memory 150, normal memory cells labeled generally as Cell are coupled to word lines WLn, bit lines BLi, and a common source line CS typically connected to ground. Unlike the memory cells, however, the light-sensing cells of the arrays 152a and 152b are not connected to the common source line CS. The light-sensing cells of the arrays 152a and 152b correspond to off-states of the normal memory cells Cell.

The light-sensing cells shown in FIG. 2 just relate to an exemplary embodiment according to the present invention. The light-sensing cells may be configured in various structures including a junction for generating a leakage current by sensing light. If the memory 150 is a kind of flash memory, the light-sensing cells may be configured in various structures, for example, a general NOR cell, a stacked-gate cell, a split-gate cell, or a source-side injection cell.

A stacked-gate cell (not shown) is formed with floating and control gates stacked in sequence. On the other hand, the stacked-gate cell usually has the problem of over-erasure. The over-erasure arises from an excessive discharge of the floating gate in an erasing operation. A threshold voltage of an over-erased cell is conditioned in a negative value, causing inadvertent current flow therethrough even though the cell is deselected. The structure of a split-gate cell has been proposed with the purpose of overcoming such an over-erasure trouble.

A split-gate cell (not shown) is helpful in overcoming the problem of over-erasure by means of a selection gate portion that is placed under a control gate thereof. In other words, the selection gate portion functions to interrupt a leakage current from a floating gate channel that is placed under a floating gate that is excessively discharged. During this time, the control gate is turned off. Such a split-gate cell, however, is disadvantageous in programming efficiency. In other words, the split-gate cell may dissipate power needlessly and be programmed in a slow speed. The structure of a source-side injection cell is proposed to improve the programming efficiency.

A source-side injection cell (not shown) is fabricated in a substrate having a source and drain. In the source-side injection cell, a selection gate, which is also called a side-wall gate, is formed on a sidewall of the source. With this structure, if a high voltage is applied to a control gate, hot electron injection is induced toward a floating gate from the source. Such a source-side injection cell is useful to improving the programming efficiency up to 1000~10000 times more than a conventional one.

Figure 3:
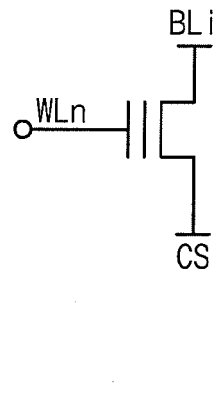
FIGS. 3 (a) and (b) illustrate types of memory cells used as storage cells in the memory shown in FIG. 2.
Figure 3:
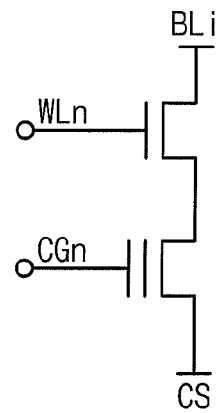

FIGS. 3, (a) and (b) illustrate types of memory cells 151 used as storage cells Cell in the memory shown in FIG. 2, and (a) shows a structure of a general NOR cell, that is, a NOR-type flash memory cell. The NOR cell is composed of a drain connected to a bit line BLi, a source connected to a common source line CS, and a gate coupled to a word line WLn. The NOR cell is programmed or erased with data in response to a voltage of the word line WLn. In FIG. 3, (b) shows a structure of an electrically erasable and programmable read-only memory (EEPROM) cell. The EEPROM cell is constructed to include a control gate cell that responds to a control signal CGn.

Figure 4:
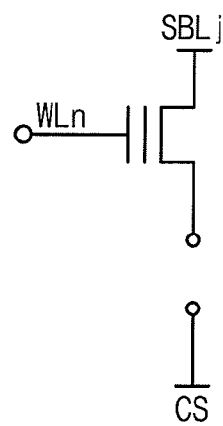
FIGS. 4 (a) and (b) illustrate types of memory cells used as light-sensing cells in the memory shown in FIG. 2.
Figure 4:
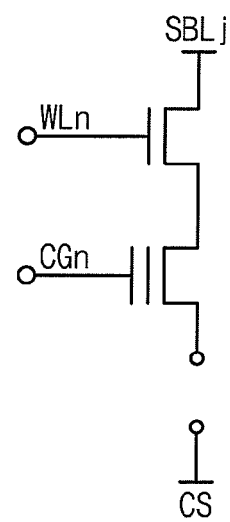

In FIGS. 4, (a) and (b) illustrate types of memory cells used as the light-sensing cells 152a and 152b in the memory 150 shown in FIG. 2 and (a) is a NOR cell type while (b) is an EEPROM cell type. The light-sensing cell shown in (b) includes a control gate cell whose control gate is coupled to a control signal CGn. The light-sensing cell of the EEPROM cell is organized including a drain connected a sensing bit line SBLj, a gate coupled to a word line WLn, and a source that is floated. The light-sensing cell 152 shown in (a) or (b) of FIG. 4 is normally conditioned in an off-state wherein it is disconnected from the common source line CS. Thus, there is no current flowing through the light-sensing cell in a normal condition. On the other hand, if light is irradiated on the light-sensing cell 152 due to an external attack by an unauthorized user, the light-sensing cell 152 generates a leakage current from its junction. This leakage current flows out to the sensing amplifier 154 by way of the sensing bit line SBLj.

The light-sensing cell 152 according to exemplary embodiments of the present invention is similar to a normal memory cell in its manufacturing process. The light-sensing cell 152 is structured similar to an adjacent normal cell, but is disconnected from the common source line.

The light-sensing cell 152 of exemplary embodiments of the present invention may not be configured to have a structure for disconnection from the common source line CS. Rather, the light-sensing cell 152 is only required to have at least a junction for generating a leakage current in response to light irradiated thereto, thereby maintaining an off-cell state in a normal condition.

Figure 5:
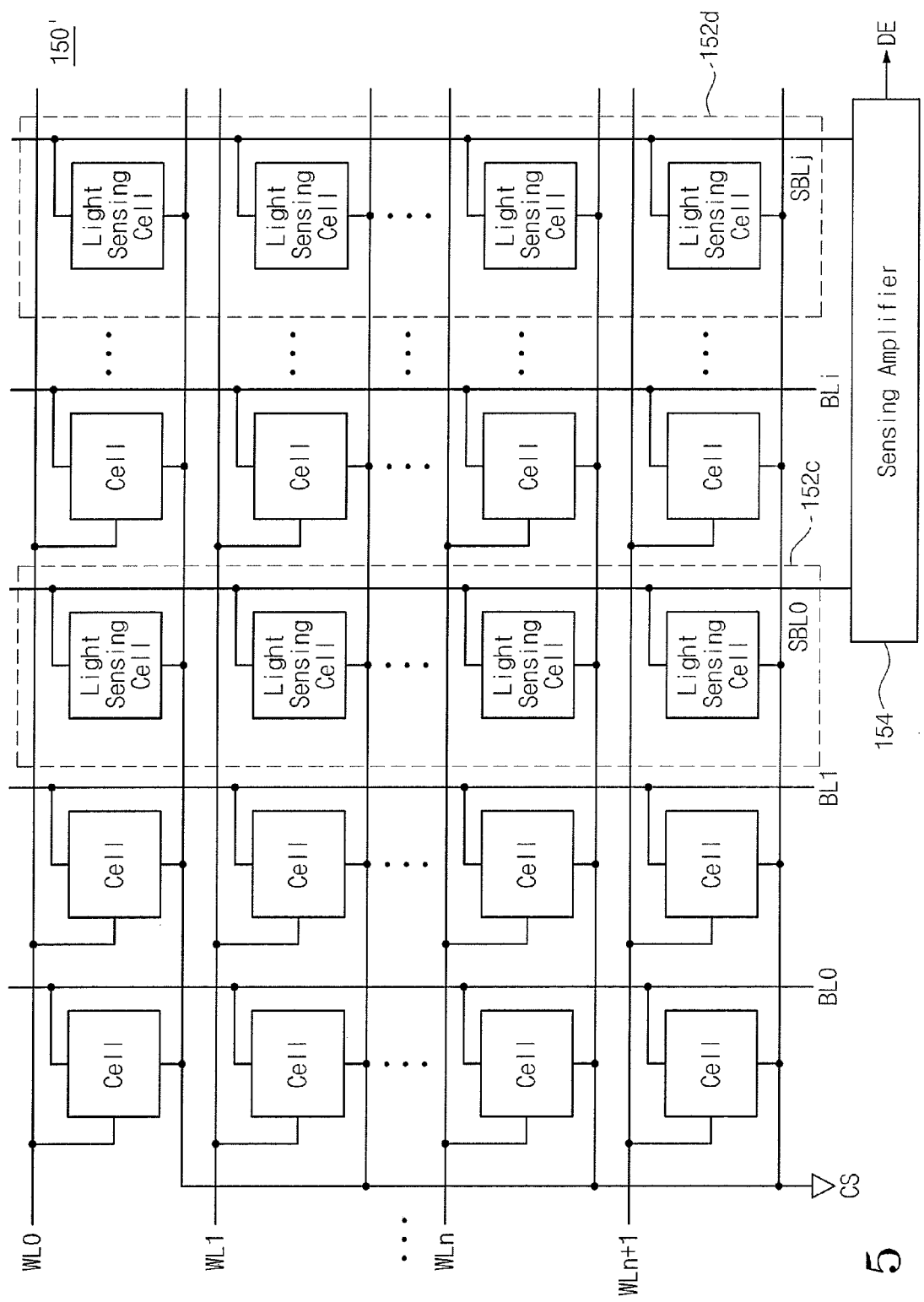
FIG. 5 is a core circuit diagram of a memory in accordance with an exemplary embodiment of the present invention.
Figure 6:
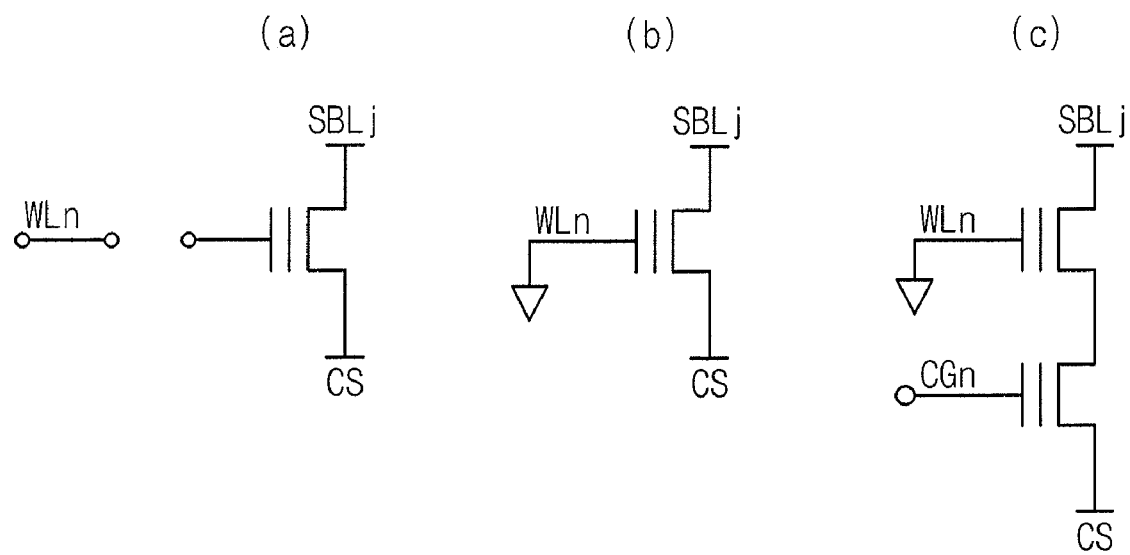
FIGS. 6 (a), (b), and (c) illustrate types of memory cells used as light-sensing cells in the memory shown in FIG. 5.

FIG. 5 shows an exemplary embodiment of the memory 150' in accordance with an exemplary embodiment of the present invention. Referring to FIG. 5, the memory 150' includes light-sensing cell arrays 152c and 152d whose gates are disconnected from a word line WLn. In the memory 150' shown in FIG. 5, if a normal memory cell Cell makes use of a general NOR cell, the light-sensing cell array 152c or 152d is formed those cells as shown in FIG. 6 (a), (b), or (c). Referring to FIGS. 6 (a), (b), and (c), the light-sensing cell 152' is configured including a drain connected to the sensing bit line SBLj and a source connected to the common source line CS. The light-sensing cell shown in (a) is structured such that its gate is floated, while gates of the light-sensing cells 152' shown in (b) and (c) are grounded. In this exemplary embodiment, the light-sensing cell of (b) is a NOR cell type, and the light-sensing cell of (c) is an EEPROM cell type. Therefore, the light-sensing cell 152' shown in (a), (b), or (c) is conditioned to be an off-cell in a normal condition. With this structure, if light is irradiated on the light-sensing cell 152', the light-sensing cell 152' generates a leakage current. The leakage current flows into the sensing amplifier 154 shown in FIG. 5 by way of the sensing bit line SBLj. The sensing amplifier 154 generates the detection signal DE by sensing the leakage current flowing through the sensing bit line SBLj. The detection signal DE is applied to the reset control circuit 160.

The smart card 100 according to exemplary embodiments of the present invention includes the sensing bit lines SBL0~SBLm connected to the light-sensing arrays. The sensing bit lines SBL0~SBLm are automatically activated when operating the normal memory cell array. On the other hand, it is not always required that the sensing bit lines be activated automatically. The memory, 150' is able to control activation of the sensing bit lines SBL0~SBLm as needed.

Figure 7:
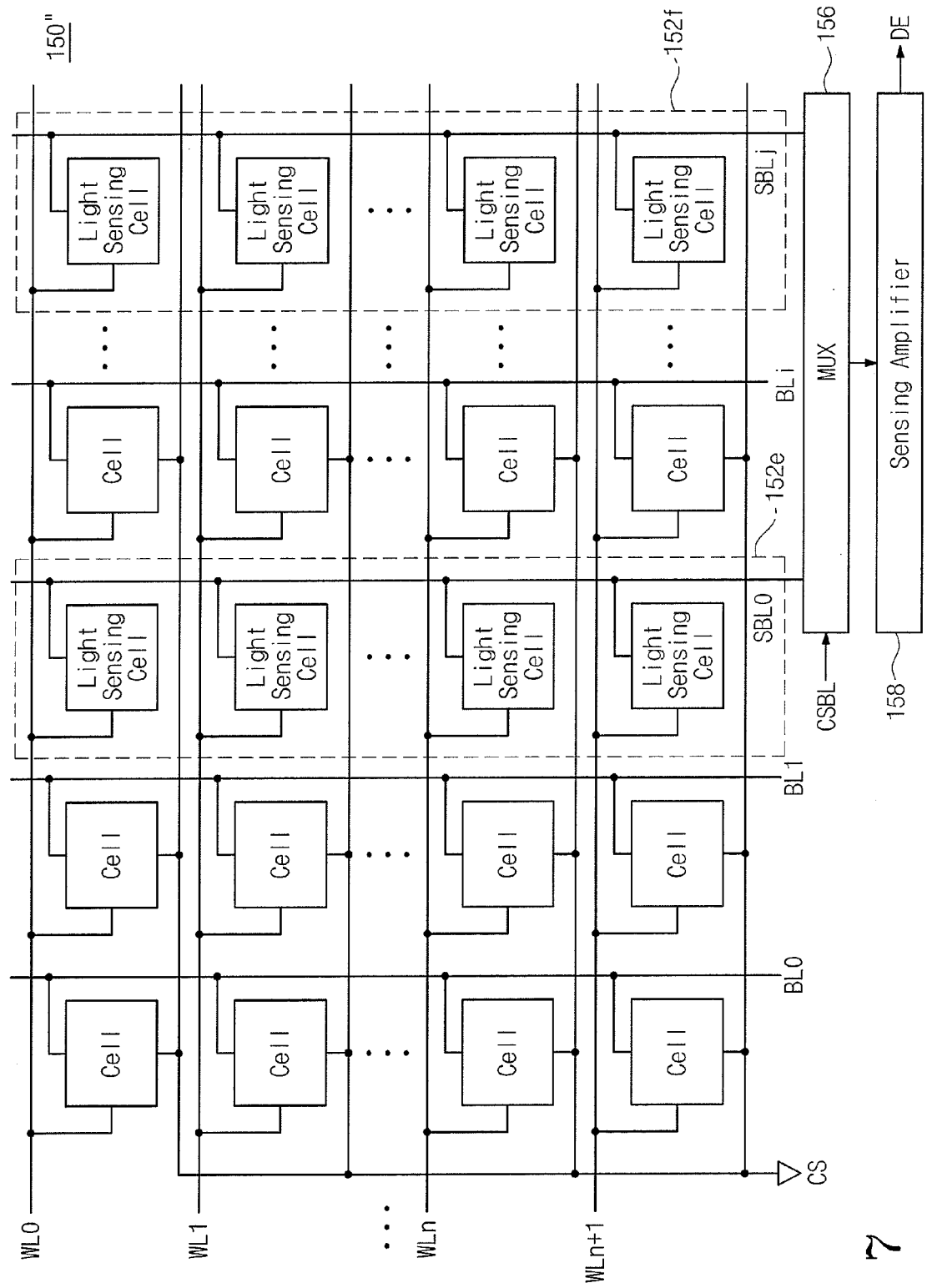
FIG. 7 illustrates an exemplary embodiment of a memory able to control sensing bit lines therein.

FIG. 7 illustrates an exemplary embodiment of a memory 150" that is able to control the sensing bit lines SBL0~SBLm therein. Referring to FIG. 7, the memory 150" according to an exemplary embodiment of the present invention is comprised of a memory cell array including light-sensing cell arrays 152e and 152f, a multiplexer (MUX) 156 for selecting the light-sensing cell arrays 152e and 152f, and a sensing amplifier 158. The memory 150" operates to select the light-sensing cell array to sense light in response to a control signal CSBL. In other words, the sensing bit lines SBL0~SBLm connected to the light-sensing cell array are partially selected for sensing light.

The multiplexer 156 may be simply formed of switching transistors (not shown) each connected to the sensing bit lines SBL0~SBLm. Each switching transistor may be formed of an NMOS transistor. The control signal CSBL controls the switching transistors to select between the sensing bit lines SBL0 and SBLj.

Referring to FIG. 7, the procedure of sensing light by the memory 150" is as follows. The memory 150" selects the sensing bit line, for example, SBLj, which would be attacked by a hacker, in response to the control signal CSBL. The light-sensing cell array 152f connected to the selected sensing bit lines SBLj generates a leakage current in response to light irradiation thereon. The leakage current flows into the sensing amplifier 158 by way of the selected sensing bit line SBLj. The sensing amplifier 158 generates and applies the detection signal DE in accordance with the leakage current.

Referring to FIGS. 2, 5, and 7, the memories 150, 150', and 150' of the smart card 100 according to exemplary embodiments of the present invention are structured in the light-sensing array, but are not restrictive hereto. The smart card 100 of exemplary embodiments of the present invention may be also configured with a memory cell array including another proper modification of light-sensing cell.

The light-sensing cell according to exemplary embodiments of the present invention is easily fabricated by the process similar to that of forming the normal memory cell of the memory cell array.

Further, it is able to sense a local light irradiation by arranging the light-sensing cells, which are smaller than laser spots, in the memory cell array. Thereby, the smart card 100 according to exemplary embodiments of the present invention is improved in security level.

As described above, a memory having light-sensing cells for sensing locally irradiated light is helpful in enhancing the security level of the smart card.

The above-disclosed subject matter is to be considered illustrative, and not restrictive, and the appended claims are intended to cover all such modifications, enhancements, and other exemplary embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A smart card comprising:
   a memory storing user information and having light-sensing cells to sense externally supplied light and generating a detection signal in response to the light sensed by the light-sensing cells; and
   a reset control circuit generating a reset signal in response to the detection signal, the reset signal operating to reset the smart card.

2. The smart card as set forth in claim 1, wherein each light-sensing cell includes a junction from which a leakage current is generated.

3. The smart card as set forth in claim 1, wherein the light-sensing cells are arranged in a plurality of light-sensing arrays between a plurality of memory cell arrays.

4. The smart card as set forth in claim 3, wherein the light-sensing cells are normally conditioned to be off-cells.

5. The smart card as set forth in claim 4, wherein the memory comprises:
   the plurality of memory cell arrays including normal cells each of which has a drain connected to a bit line, a source connected to a common source line, and a gate coupled to a word line;
   the plurality of light-sensing cell arrays including normal cells each of which has a drain connected to a sensing bit line, a gate coupled to the word line, and a source that is floated; and
   a sensing amplifier connected to the sensing bit line, and generating the detection signal by sensing a leakage signal that flows through the sensing bit line from a light-sensing cell when the externally supplied light is irradiated on the light-sensing cell.

6. The smart card as set forth in claim 5, wherein the normal cells are NOR-type cells.

7. The smart card as set forth in claim 6, wherein the normal cells are one of a stacked-gate cell, a split-gate cell, and a source-side injection cell.

8. The smart card as set forth in claim 4, wherein the memory comprises:
   the plurality of memory cell arrays including normal cells each of which has a drain connected to a bit line, a source connected to a common source line, and a gate coupled to a word line;
   the plurality of light-sensing cell arrays including normal cells each of which has a drain connected to a sensing bit line, a source connected to the common source line, and a gate that is floated; and
   a sensing amplifier connected to the sensing bit line, and generating the detection signal by sensing a leakage signal that flows through the sensing bit line from a light-sensing cell when the externally supplied light is irradiated on the light-sensing cell.

9. The smart card as set forth in claim 4, wherein the memory comprises:
   the plurality of memory cell arrays including normal cells each of which has a drain connected to a bit line, a source connected to a common source line, and a gate coupled to a word line;
   the plurality of light-sensing cell arrays including normal cells each of which has a drain connected to a sensing bit line, a source connected to the common source line, and a gate that is grounded; and
   a sensing amplifier connected to the sensing bit line, and generating the detection signal by sensing a leakage signal that flows through the sensing bit line from a light-sensing cell when the externally supplied light is irradiated on the light-sensing cell.

10. The smart card as set forth in claim 4, wherein the memory comprises:
    the plurality of memory cell arrays including normal cells each of which has a drain connected to a bit line, a source connected to a common source line, and a gate coupled to a word line;
    the plurality of light-sensing cell arrays including normal cells each of which has a drain connected to a sensing bit line, a gate coupled to the word line, and a source that is floated;
    a multiplexer selectively activating the plurality of sensing bit lines in response to a selection signal; and
    a sensing amplifier generating the detection signal by sensing a leakage signal that flows through the sensing bit line from the light-sensing cell when the externally supplied light is irradiated on the light-sensing cell.

11. The smart card as set forth in claim 10, wherein the multiplexer comprises a plurality of NMOS transistors, wherein each NMOS transistor includes a drain connected to the sensing bit line, a source connected to the sensing amplifier, and a gate coupled to the selection signal.

12. The smart card as set forth in claim 4, wherein the memory comprises:

the plurality of memory cell arrays including normal cells each of which has a drain connected to a bit line, a source connected to a common source line, and a gate coupled to a word line;

the plurality of light-sensing cell arrays including normal cells each of which has a drain connected to a sensing bit line, a source connected to the common source line, and a gate that is floated;

a multiplexer selectively activating the plurality of sensing bit lines in response to a selection signal; and a sensing amplifier connected to the sensing bit line, generating the detection signal by sensing a leakage signal that flows through the sensing bit line from a light-sensing cell when the externally supplied light is irradiated on the light-sensing cell.

13. The smart card as set forth in claim 12, wherein the multiplexer comprises a plurality of NMOS transistors, wherein each NMOS transistor includes a drain connected to the sensing bit line, a source connected to the sensing amplifier, and a gate coupled to the selection signal.

14. The smart card as set forth in claim 1, wherein the memory comprises a nonvolatile memory.

* * * * *